2/9/88 OR 4,723,447

United States Patent [19]

Laing

[11] Patent Number: 4,723,447

[45] Date of Patent: Feb. 9, 1988

[54] INERTIA-SENSITIVE DEVICE

[75] Inventor: John Laing, Gillingham, England

[73] Assignee: Tapeimp Limited, North Yorkshire, England

[21] Appl. No.: 842,122

[22] Filed: Mar. 20, 1986

[30] Foreign Application Priority Data

Jul. 25, 1985 [GB] United Kingdom ................ 8518769

[51] Int. Cl.[4] ...................... G01H 11/08; G08B 13/00

[52] U.S. Cl. ...................................... 73/654; 340/566; 340/689

[58] Field of Search ............ 73/652, 654, 514, 517 R; 310/329; 340/52 H, 65, 566, 669, 689; 307/121

[56] References Cited

U.S. PATENT DOCUMENTS 3,631,271 12/1971 Shimada ............................ 340/689

4,656,458 4/1987 Iwata .................................... 73/652

FOREIGN PATENT DOCUMENTS 13323 1/1982 Japan .................................... 73/652

*Primary Examiner*—John Chapman

*Attorney, Agent, or Firm*—Rodman & Rodman

[57] ABSTRACT

An inertia-sensitive device for detecting movement of, or impact on, the device or vibrations in its vicinity comprises a housing having a flat or concave surface, a ball freely supported within the housing upon that surface, the ball and/or the surface having an uneven texture, and a piezoelectric detector in direct or indirect contact with said housing. In one form of the device, which is illustrated, the surface is roughened and extends to a full spherical surface and the ball is of steel.

6 Claims, 1 Drawing Figure

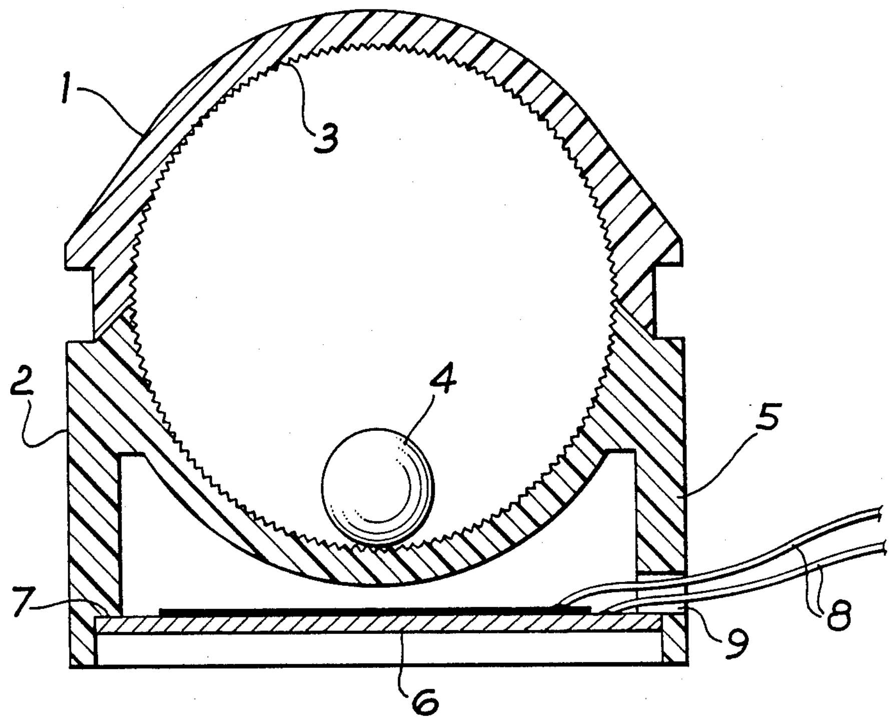
1
3
2
4
5
7
8
9
6

INERTIA-SENSITIVE DEVICE

The present invention is an inertia-sensitive device, that is a device designed to detect motion.

Inertia-sensitive devices have become well known, particularly in recent years, and are widely used in detecting either the moving of an article being protected or the presence of a person nearby. Thus they have applications in the fields of industrial and domestic security and of defence.

Most inertia-sensitive devices hitherto available comprise a set of gold-plated contacts so arranged that any impact or vibration causes a pair of contacts to open or close, possibly only momentarily. Devices of this type show various disadvantages. For example, the gold plating of the contacts is important in resisting oxidisation but makes such devices unduly expensive. In addition, such devices usually require a relatively large current supply in order to operate satisfactorily and this makes them unsuitable for powering from a battery.

A further important disadvantage is that devices of this prior type are gravity-dependent and can therefore operate correctly only when they are mounted in a given position relative to the vertical.

There is a clear need for an improved form of inertia-sensitive device in which some at least of the disadvantages of prior devices are reduced or eliminated. It is an object of the present invention to provide such an improved device.

The inertia-sensitive device according to the present invention comprises a housing having a flat or concave surface, a ball freely supported within said housing upon said surface, at least one of said ball and said surface having an uneven texture, and piezoelectric detector means in direct or indirect contact with said housing.

The housing may be open or closed but it is advantageous for the housing to be a closed housing so as to render the device more readily portable and also to permit the adoption of a more extensive ball-support surface as described below.

The surface upon which the ball is supported may be flat but it is strongly preferred that it be concave, in particular of uniform spherical curvature. The radius of curvature of the concave surface may be large compared with that of the ball, for example between ten and twenty times that of the ball. However in a preferred form of the device the radius of the concave surface is not greater than five times the radius of the ball. By observing this latter limitation, it is possible to increase the angular extent of the concave surface without unduly enlarging the device overall, while simultaneously retaining the desired sensitivity of the device. Thus the concave surface may extend to one-third or one-half a sphere or more. In a particularly preferred form of the device according to the invention, the surface is a full spherical surface.

The ball is preferably made of a dense material, as it is the uneven movement of the ball over the support surface in response to displacement of the device overall or to nearby vibrations, which initiates a warning signal in the piezoelectric detector means. Preferably the ball is of metal, in particular of steel such as is used in ball bearings.

The support surface or the ball, or both, has an uneven texture, so that when the ball moves over the support surface the movement is uneven. The unevenness may be a regular unevenness, for example corrugations, or an irregular overall roughness. It is particularly preferred that the surface of the ball itself be smooth and that the support surface be rough in character.

In a preferred form of the invention, the housing is a moulding, especially a two-part moulding, in a rigid synthetic plastics material and the support surface roughness may then be moulded into the housing during its formation. Advantageously, the housing may be moulded in an ABS resin.

Vibrations generated in the housing are sensed by a piezoelectric detector means and to this end, the detector means is in direct or indirect contact with the housing. For enhanced sensitivity, the detector means is preferably in the form of a thin sheet of piezoelectric material, supported by the housing at only a small part of its area, for example at a narrow strip of the sheet in the region of its edge. The sheet may typically be of asymmetrical crystalline material or it may be a piezoelectric ceramic material.

The signal generated by vibrations in the piezoelectric material may be used to give a visual or audible alarm, either at the device itself or at a remote location, or it may if desired be used to give an oscilloscope display, such as for a record of seismic activity. In another form of the invention, the signal may operate a switch to interrupt or close an electrical circuit.

The invention will now be further described with reference to the accompanying drawing, which is a sectional view of one preferred embodiment of inertia-sensitive device according to the present invention.

The illustrated device comprises a housing constructed in two parts from ABS resin, namely a housing upper half 1 and lower half 2. The combined inner faces of the two housing halves when assembled from a continuous spherical surface 3, which is rough in character, the surface roughness having been formed during moulding of the housing halves. Supported on the surface 3 and retained within the housing is a stainless steel ball 4, whose diameter is approximately one quarter of the diameter of the spherical surface 3.

Mounted in a cylindrical extension 5 of the lower housing half 2 is a disc 6 of piezoelectric or piezoceramic material, supported at only a narrow area 7 of its circumference. Electrical leads 8 pass through an aperture 9 in the housing half 2 and convey any signal generated in the disc 6 to a conventional audible alarm (not shown).

In use, the device is mounted upon an item to be protected against theft or within an area to be protected against unauthorized intruders. It is an advantage of the illustrated device that it does not have to be fixed in any particular orientation. Any movement of the device, or impact upon it, or any adjacent vibration causes the ball 4 to move over the surface 3 and thereby pass enhanced vibrations (caused by the roughness of the surface 3) to the disc 6. Vibration of the piezoelectric disc 6 generates an electric signal, which is conveyed by the leads 8 to the alarm and thereby gives warning of the incident which first caused the ball to move.

The following experimental Example illustrates the response obtained by generating vibrations in the vicinity of the device.

EXAMPLE

The inertia-sensitive device illustrated in the drawing was approximately 21 mm in diameter and was mounted upon a plate of acrylic thermoplastic material sold under the trade mark "Perspex". The plate measured 320 mm by 200 mm and was 20 mm thick. Varying weights were dropped on to the plate from a height of 500 mm and at a distance of 200 mm from the device. The following table gives the size of the piezoelectric signals generated by the different weights:

| Weight (grm.) | Signal (Volts peak-to-peak) |
|---|---|
| 0.25 | 1.8 |
| 1.00 | 3.0 |
| 2.00 | 7.0 |
| 3.50 | 7.5 |
| 5.00 | 8.0 |
| 10.00 | 8.0 |
| 15.00 | 7.7 |
| 20.00 | 7.7 |
| 30.00 | 8.0 |
| 40.00 | 9.0 |
| 50.00 | 15.0 |
| 60.00 | 17.0 |

Because the signal generated by the device is dependent upon the size of the impact or vibration, the device may in use be readily designed to meet the sensitivity requirements of a particular situation and to distinguish between, say, unauthorized intrusion and incidental ambient vibrations.

I claim:

1. An inertia-sensitive device for detecting movement, impact or vibrations, comprising:

(a) a closed housing made of a molded rigid synthetic plastics material;

(b) said housing having molded therein a spherical concave uneven surface;

(c) a metal ball supported within said housing upon said spherical surface;

(d) the radius of said ball being not less than one twentieth of the radius of said spherical surface;

(e) a generally tubular extension formed integral with said housing and projecting therefrom to an end portion, whereby to constitute a support for said housing;

(f) piezoelectric detector means secured across the end portion of said generally tubular extension remote from said housing; and (g) said piezoelectric detector means comprising a thin sheet of piezoelectric material having a peripheral edge portion, said piezoelectric material being supported on said tubular extension only at said peripheral edge portion.

2. An inertia-sensitive device according to claim 1 wherein said generally tubular extension is a cylindrical extension.

3. An inertia-sensitive device according to claim 2 wherein the radius of said metal ball is not less than one fifth of the radius of said spherical surface.

4. An inertia-sensitive device according to claim 3 wherein said metal ball is made of steel.

5. An inertia-sensitive device according to claim 2 wherein said cylindrical extension encompasses said piezoelectric detector.

6. An inertia-sensitive device according to claim 5 wherein said cylindrical extension further encompasses a portion of said closed housing.

* * * * *